United States Patent [19]
Biswal et al.

[11] Patent Number: 5,757,839
[45] Date of Patent: May 26, 1998

[54] OPTICAL PUMPING METHOD AND APPARATUS

[75] Inventors: Subrat Biswal; Gerard A. Mourou, both of Ann Arbor, Mich.

[73] Assignee: The Regents of the University of Michigan, Ann Arbor, Mich.

[21] Appl. No.: 727,022

[22] Filed: Oct. 8, 1996

[51] Int. Cl.$^6$ .................................................... H01S 3/091
[52] U.S. Cl. .................. 372/72; 372/34; 372/70
[58] Field of Search ..................... 372/33, 34, 39, 372/66, 67, 70, 71, 72, 109

[56] References Cited

U.S. PATENT DOCUMENTS

| | | | |
|---|---|---|---|
| 3,633,126 | 1/1972 | Martin et al. | 372/35 |
| 4,555,786 | 11/1985 | Byer | 372/70 |
| 4,567,597 | 1/1986 | Mandella | 372/34 |
| 4,655,547 | 4/1987 | Heritage et al. | 359/563 |
| 4,764,930 | 8/1988 | Bille et al. | 372/23 |
| 4,789,988 | 12/1988 | Trost | 372/34 |
| 4,833,682 | 5/1989 | Byer et al. | 372/34 |
| 4,845,721 | 7/1989 | Hoffmann | 372/34 |
| 4,890,289 | 12/1989 | Basu et al. | 372/33 |
| 5,034,953 | 7/1991 | Sekiguchi | 372/34 |
| 5,172,388 | 12/1992 | Long et al. | 372/70 |
| 5,235,606 | 8/1993 | Mourou et al. | 372/25 |
| 5,312,396 | 5/1994 | Feld et al. | 606/11 |
| 5,339,328 | 8/1994 | Miura | 372/70 |
| 5,353,291 | 10/1994 | Sprangle et al. | 372/5 |

OTHER PUBLICATIONS

S. Basu and R.L. Byer, "40-W Average Power, 30-Hz Moving-Slab Nd:Glass Laser," Optics Letters, vol. 11, No. 10, 617-619, Oct. 1986.

S. Basu, T.J. Kane, and R.L. Byer, "A Proposed 1kW Average Power Moving Slab Nd: Glass Laser," IEEE Journal of Quantum Electronics, vol. EQ-22, No. 10, 2052-2057, Oct. 1986.

T. Dimmick, "Semiconductor-Laser-Pumped, CW Mode-Locked Nd:Phosphate Glass Laser Oscillator and Regenerative Amplifier," Optics Letters, vol. 15, No. 3, 177-179, Feb. 1, 1990.

S. Basu and R.L. Byer, "Average Power Limits of Diode-Laser-Pumped Solid State Lasers," Applied Optics, vol. 29, No. 12, 1765-1771, Apr. 20, 1990.

(List continued on next page.)

*Primary Examiner*—John D. Lee
*Attorney, Agent, or Firm*—Barnes, Kisselle, Raisch, Choate, Whittemore & Hulbert, P.C.

[57] ABSTRACT

In order to avoid problems associated with thermal distortion, loss of energy, and destruction of system components, the invention provides a means for producing, for the first time, high repetition rate, high power pulses while avoiding thermal distortion and its attendant difficulties. The invention provides the ability to remove heat generated from the gain media (lasant material) and to repeatedly extract energy from the media without the accumulation of heat in the media which causes thermal distortions. The invention avoids thermal distortions by pumping an unheated gain region every time an optical pulse is incident thereon. In one aspect, the gain media is essentially uniformly pumped using an essentially instantaneous uniform spatial profile provided by a multi-mode oscillator. The resulting instantaneous uniform temperature profile does not create thermal gradients, thus, no thermal distortions occur. In the invention, the total time duration of pumping and lasing or amplification takes place while the thermal profile remains uniform in the region of the media in the beam path. Thus, no thermal distortions occur during the time of pumping and lasing or amplification. Heat is preferably extracted at about the same rate it is generated in the lasant material (media).

29 Claims, 15 Drawing Sheets

OTHER PUBLICATIONS

J. Squier, F. Salin, G. Mourou, and D. Harter, "100-fs Pulse Generation and Amplification in Ti:Al$_2$O$_3$," Optics Letters, vol. 16, No. 5, 324–326, Mar. 1, 1991.

J. Korn, T.H. Jeys, and T.Y. Fan, "Continuous–Wave Operation of a Diode–Pumped Rotating Nd:Glass Disk Laser," Optics Letters, vol. 16, No. 22, 1741–1743, Nov. 15, 1991.

J. Squier and G. Mourou, "Tunable Solid–State Lasers Create Ultrashort Pulses," Laser Focus World, Jun. 1992, 3 pages.

G. Zhang, G. Huang, S. Gu, G. Gu, B. Sun, and Z. Wang, "A Rotating Hollow Cylinder Nd : Glass Laser," Chinese Journal of Lasers (E.E.), vol. 1, No. 3, 203–212, Jun. 1992.

Y. Beaudoin, C.Y. Chien, J.S. Coe, J.L. Tapié, and G. Mourou, "Ultrahigh–Contrast Ti:Sapphire/Nd:Glass Terawatt Laser System," Optics Letters, vol. 17, No. 12, 865–867, Jun. 15, 1992.

T.B. Norris, "Femtosecond Pulse Amplification at 250 kHz with a Ti:Sapphire Regenerative Amplifier and Application to Continuum Generation," Optics Letters, vol. 17, No. 14, 1009–1011, Jul. 15, 1992.

H.C. Kapteyn and M.M. Murnane, "Femtosecond Lasers: The Next Generation," Optics & Photonics, 20–28, Mar. 1994.

A. Faulstich, H.J. Baker, and D.R. Hall, "Face Pumping of Thin, Solid–State Slab Lasers with Laser Diodes," Optics Letters, vol. 21, No. 8, 594–596, Apr. 15, 1996.

Cross sectional view of revolving hollow cylinder

View of laser beam propagating through wall of hollow cylinder

Side view of rotating disk 60  62  64

66

70
72
74
76

Cross-section of moving slab

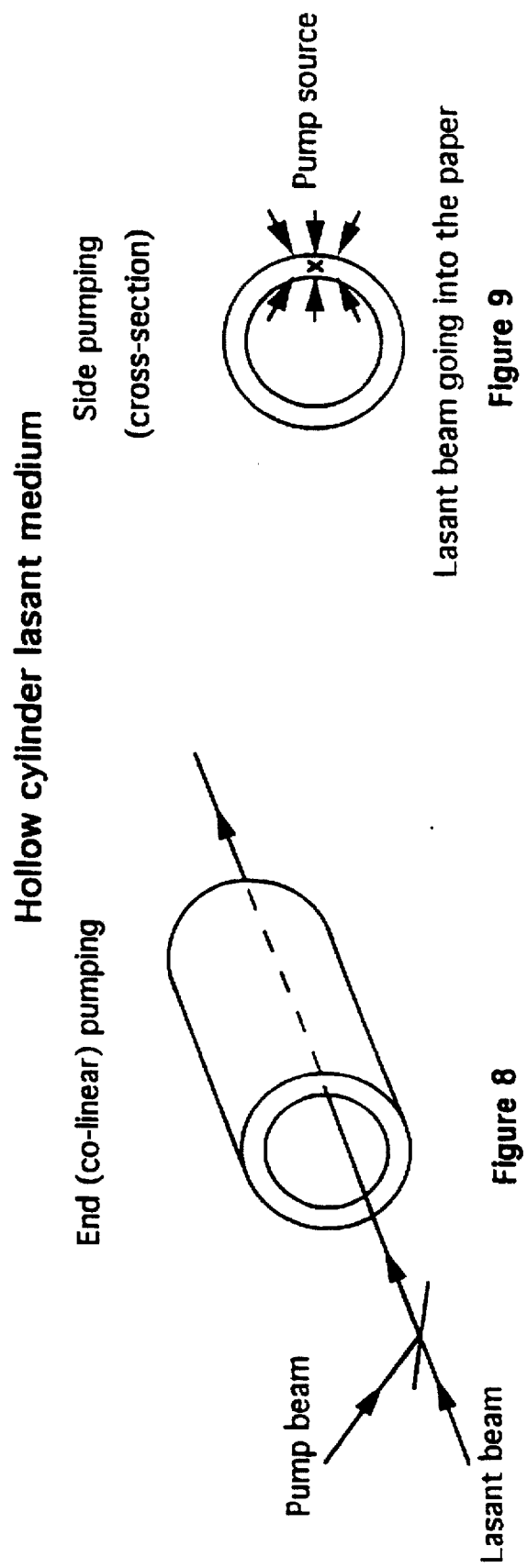

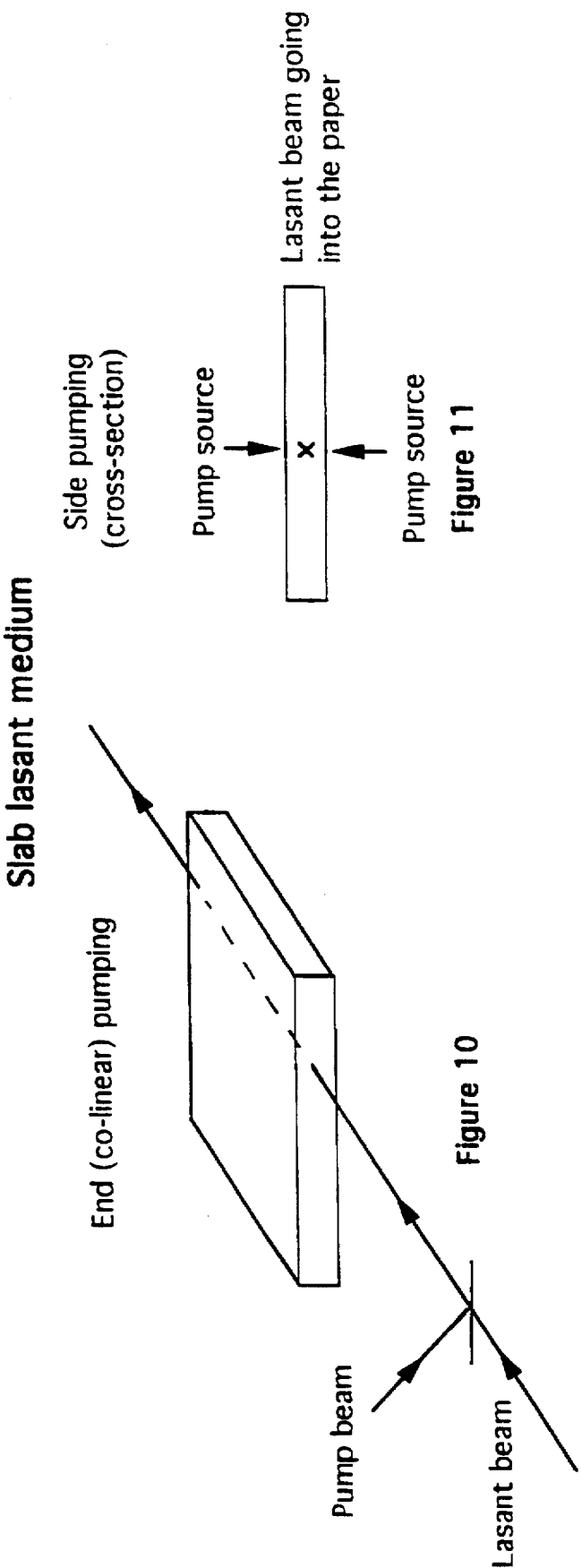

Disk lasant medium
End (co-linear) pumping
Pump source
Lasant beam

Cross-section of hollow cylinder

Side view of disk 60  64
 62

70
72
74

Cross-section of slab

OPTICAL PUMPING METHOD AND APPARATUS

GOVERNMENT RIGHTS

This invention was made with government support provided by the National Science Foundation under the terms of No. STC PHY 8920108. The government has certain rights in the invention.

FIELD OF THE INVENTION

This invention relates generally to laser systems and more specifically to methods and apparatus for generating high average power optical pulses of high energy optical pulses at high repetition rate.

BACKGROUND OF THE INVENTION

The generation of high average power optical pulses at a high repetition rate is a subject of much current interest because of its potential for use in applications such as material structural dynamics, industrial machining, laser fusion, particle accelerators, and x-ray sources. In order to attain a high average power desired for the above applications, the laser mediums (such as Nd:glass and Yb:glass) must be able to store a large amount of energy and the laser must be able to operate at a high repetition rate. Nd:glass and Yb:glass have the capability to easily store a large amount of energy, since glass can be grown to a large size with a high doping concentration at a relatively low cost. However, the repetition rate and, thus, the average power of glass lasers has been limited due to poor thermal conductivity of glass resulting in detrimental thermal effects. As a result, such applications, as listed above, have not been fully realized. The thermal effects can be divided into two groups, thermal distortions and thermal fracture. The thermal distortions limit the average power by introducing loss through thermal lensing, thermal birefringence, and higher order aberrations. These thermal distortions are created due to a non-uniform temperature profile. Thermal fracture of the glass is caused when the thermal induced stress is sufficient to physically damage the glass, thus, limiting the maximum heat load in the glass.

Currently, most commercially available high power lasers use a stationary cylindrical geometry for the laser medium. In order to attempt to reduce thermal effects found in the conventional laser material (gain media) geometry, techniques such as phase conjugation, and zig zag path in a lasant slab have been attempted to reduce thermal distortions. One approach to minimizing the effects of thermal induced distortions is to cause a lasant beam to be internally reflected within gain media over a zig zag path. This approach is described in U.S. Pat. No. 3,633,126. In this example, a slab of lasant glass is used and a laser beam is totally internally reflected within the slab over a zig zag path. The zig zag path of the beam attempts to eliminate the effect of temperature difference between the slab face and the slab center. The zig zag path attempts to eliminate the thermal lensing caused by this temperature difference. The slab geometry eliminates thermal birefringence. However, the configuration is very complex and not practical in a commercial setting because the zig zag propagation occurs at a total internal reflection angle and such zig zag propagation is only possible if certain difficult conditions are met and carefully maintained. Further, in such a system it is necessary to obtain a very exact type tolerance and high polish in order to prevent loss from each reflection. This is not practical, so losses do occur and the system is inefficient.

The complexity, low efficiency, and high fabrication cost of such a method have rendered such systems and methods commercially undesirable. Moving a solid state laser medium to spread out the heat load has been demonstrated by several groups. By moving the laser medium, the volume of the laser medium over which the heat is distributed is increased, thus, the maximum heat load at which stress fracture occurs is increased. However, moving the laser medium does not solve the problem of thermal distortions. In addition to moving the laser medium, Basu and Byer used a zig zag slab (U.S. Pat. Nos. 4,555,786; 4,833,682; and 4,789,988) and proposed the use of thin disks (S. Basu and R. L. Byer, Applied Optics, Vol. 12, p. 1765, 1990) to eliminate thermal distortions, whereas Mandella (U.S. Pat. No. 4,567,597) and Zhang et al (Chinese Journal of Lasers, Vol. 1, p. 203, 1992) made no mention of a method to reduce thermal distortion. Of the two thermal effects, the thermal distortions limit the average power of high energy laser systems, since thermal distortions typically occur at a lower heat load compared to thermal fracture. While both the stationary and moving zig zag slab lasers have reached a high average power of a kilowatt, complexity, low efficiency, and high fabrication cost have limited the acceptance of the zig zag slab. For the rotating disk geometry, thin disks are required to eliminate thermal distortions. Thus, numerous thin disks are needed to achieve high average power. Therefore, what is needed is a new approach and a new system for increasing the average power of a series of optical pulses while at the same time enabling a reasonably high repetition rate and avoiding the undesirable effects of thermal distortion. The new method and new system should be relatively inexpensive and adaptable to commercial use.

SUMMARY OF THE INVENTION

It is a general object to provide a novel method and new system for pumping a gain region of lasant material where every shot (pulse) of the laser minimizes or completely avoids thermal effects on each pulse repetition. This is accomplished by uniformly pumping a gain region of media providing an essentially instantaneous, uniform temperature profile which is transverse to the lasant beam path in the gain region, thus avoiding thermal distortions. The invention also provides a method and apparatus for essentially eliminating thermal distortions where the total time duration of pumping and lasing or amplification takes place while the temperature profile remains essentially uniform.

The basic sequence of steps in the method of the invention are first to provide a lasant material which is at an initial base temperature prior to being irradiated with optical energy. Preferably, there is also provided with the lasant material a cooling means at one or more surfaces of the material for maintaining the base temperature. Next, a pump pulse is generated which contains optical pump energy. The pump pulse is directed onto a first region of the lasant material and energy from the pump pulse is absorbed in the first region. Some of the absorbed pump energy is converted into heat. Some, and preferably most, of the absorbed pump energy is stored in the first region of the lasant material. Next, the first region of the lasant material begins to emit some of the stored energy and preferably most of the stored energy as coherent radiation. Meanwhile, the heat in the first region of the lasant material causes an increase in temperature of the lasant material above the base temperature. In the method of the invention, the deposition of optical pump energy is controlled so that the temperature profile in the first region of the lasant material is proportional to the heat profile. That is, assuming the irradiated region of the lasant material is of a circular configuration, the temperature in the region as a function of radius is essentially constant. The elevation of temperature in the affected first region of the lasant material causes a change in the index of refraction within the first region of the lasant material. The change in the index of refraction in the first region of the lasant material is proportional to the temperature profile and also the heat profile, and is essentially instantaneous and uniform in the area transverse to the lasant beam path. The invention provides a uniform or near uniform deposition of heat in the irradiated region of the laser media from the pumping, resulting in the uniform temperature profile whereby thermal induced distortions, such as thermal focusing and depolarization are significantly reduced, minimized, and preferably eliminated. Further, the total time for emission (amplifying) is controlled so that such emission time is less than the time for heat to dissipate from the irradiated region causing a non-uniform temperature profile. Accordingly, by the method of the invention, a uniform or near uniform temperature profile is achieved. Heat begins to move from the pumped first region of the lasant media to the surface of the lasant material being cooled. And migration of heat to adjacent media is minimized and preferably avoided.

Next, the pumped first region of the lasant material is moved before the first region is irradiated again with optical pump energy. Movement of the first region of the lasant material positions a second, unheated region of the lasant material (different from the first region) in the beam path of the pump pulse and the sequence of the aforementioned method is then repeated at the second region. Namely, generating the pump pulse, directing the pump pulse to the second region for absorption of energy in the second region; storage of energy in the second region; and then emission of stored energy from the second region. Meanwhile, the heat in the second region of the lasant media causes an increase in the temperature profile which is essentially uniform causing an essentially uniform change in the index of refraction in the second region. Next, heat begins to move from the second region of the lasant material to a surface of the lasant material where a heat transfer material or heat sink absorbs heat at about the same rate at which it is generated. This again avoids migration of heat from the second region to adjacent media. As can be seen, the previously pumped first region is being cooled while the second region is being irradiated.

Repeating the sequence, a third region is irradiated while the second region cools and the first region continues to cool. The time for cooling of the first region is sufficient to provide the first region at essentially its initial base temperature before the first region is, again, irradiated by another pump pulse. The sequence of steps, as described above, are repeated for any desired number of pump pulses. As can be seen, the method of the invention provides an operating sequence that provides any region of the lasant material being at the base temperature before positioning in the pump beam path and irradiation thereof. Advantageously, the method of the invention may be practiced essentially continuously at a high pump pulse repetition rate on the order of at least 1 hertz and typically on the order of 100 hertz to 1 kilohertz. Advantageously, the method of the invention provides a heat profile which is proportional to the beam profile of the pump pulse beam which is uniform. This provides the instantaneous temperature profile within the media being uniform and the index of refraction profile in the irradiated region of the material being uniform, thus reducing and preferably eliminating thermal distortions caused by conventional systems. Such undesired distortions in conventional systems occur due to a non-uniform index of refraction profile which is avoided by the method of the invention.

Although the sequence of steps set forth above illustrates movement of the lasant material (gain media), it is merely required that there be relative movement between the media and the beam path of the pump pulse. It is possible to move the beam path and the media remains stationary. However, it is preferred that the beam path is stationary and the material is moved relative to the beam path. The motion of the media can be continuous or stepwise. It is desired that the media be moved essentially continuously. It is preferred that the media be a cylinder which is rotated and the motion cycle time of the cylinder is not less than the thermal decay time of the media, whereby an irradiated region of the media is not rotated back to the beam path until it has cooled to essentially the base temperature. Therefore, after a pump pulse is directed onto a region, the region is essentially completely cooled to the base temperature before it is rotated back into the beam path. The method of the invention provides the advantage of adjusting the time period for irradiation of the media so that the irradiation of a given region is completed before a non-uniform temperature profile forms. As stated earlier, each of the pump pulses provide an essentially uniform, instantaneous temperature profile in the irradiated region of the media because such pump pulses have a uniform spatial intensity profile.

In one desirable embodiment, where the lasant host material (gain media) is glass, and preferably doped with a rare earth element, the pump pulse is delivered during a time period of less than 200 microseconds; the optical energy emission is then extracted during a time period of less than 10 microseconds; and thermal gradients characterizing heat migration form more than 1 millisecond after initiation of pump pulse delivery. The durations of the time frames described above indicate that absorption of optical energy by the media from the pump pulse and emission of optical energy from the media to an injection pulse occur before thermal gradients begin to form.

In one embodiment, the energy deposited by the pump pulse into the lasant media is extracted by another pulse which is an input optical pulse preferably generated by an oscillator which is a part of a preferred chirped pulse amplification laser system (CPA). An apparatus for producing high peak power pulses at a high repetition rate preferably comprises a means for generating a series of input optical pulses preferably at a repetition rate of greater than 10 per second (10 hertz). A stretcher stretches each of the generated input optical pulses in time to prepare them for amplification. The system then comprises a means for amplifying each of the time stretched optical pulses comprising a pump pulse generator, preferably a multi-mode pumping laser oscillator having a lasant material selected from the group consisting of alexandrite and Ti:sapphire, which generates a pump pulse defining a beam path. The pump pulses are directed onto a second lasant material which is preferably selected from the group consisting of neodymium glass and ytterbium glass. Energy from the pump pulse is absorbed by the lasant media. The input pulse then extracts energy absorbed by the lasant media by stimulating emission of the stored energy in the lasant media. The invention provides the configuration where a cooling means is provided to remove heat from an irradiated region of the lasant material. Moving means are provided and constructed and arranged to move the lasant material relative to the beam path of the pump pulse to position a selected region of the lasant material in the beam path during irradiation and to position the region away from beam path during cooling. As described above, in connection with the method of the invention, the apparatus provides the ability to essentially continuously move the lasant media relative to the beam path so that while a first irradiated region of the lasant material is being cooled a second region is being irradiated and the sequence continues for any number of pulses. This provides a high repetition rate and continuous operation while at the same time providing a time sufficient for the cooling of the first region down to essentially its initial base temperature before such first region is irradiated again. Advantageously, the invention provides a new approach, and a new system for increasing the average power of a series of optical pulses while at the same time enabling a reasonably high repetition rate and avoiding the undesirable effects of thermal distortion. The new method and new system of the invention is relatively inexpensive and adaptable to commercial use. The invention avoids the complexity, low efficiency, and high fabrication costs of conventional systems which heretofore have only met with partial success in avoiding effects of thermal distortions.

These and other objects, features, and advantages will become apparent from the following description of the preferred embodiments, claims, and accompanying drawings.

BRIEF DESCRIPTION OF THE DRAWINGS

FIG. 8 shows the path of the pump beam from which energy is absorbed by the hollow cylinder lasant medium and the path of the lasant emission beam where the two paths are co-linear for end pumping.

FIG. 9 shows the path of the pump beam from which energy is absorbed by the hollow cylinder lasant medium and the path of the lasant emission beam where the pump beam is incident from the side for side pumping with the path (x) of the lasant emission beam going into the paper.

FIG. 10 shows the path of the pump beam from which energy is absorbed by the slab lasant medium and the path of the lasant emission beam where the two paths are co-linear for end pumping.

FIG. 11 shows the path of the pump beam from which energy is absorbed by the slab lasant medium and the path of the lasant emission beam where the pump beam is incident from the side for side pumping with the path (x) of the lasant emission beam going into the paper.

FIG. 14 is a side view of the disk. In each case, the direction of heat flow is indicated by arrows.

FIG. 18a shows the hollow cylinder is stationary and is pumped for approximately 3 s at 10 hertz. FIG. 18b shows the hollow cylinder is rotating. For both interferograms, the absorbed pump energy per pulse is 1 joule.

DETAILED DESCRIPTION OF THE PREFERRED EMBODIMENTS

Figure 1:
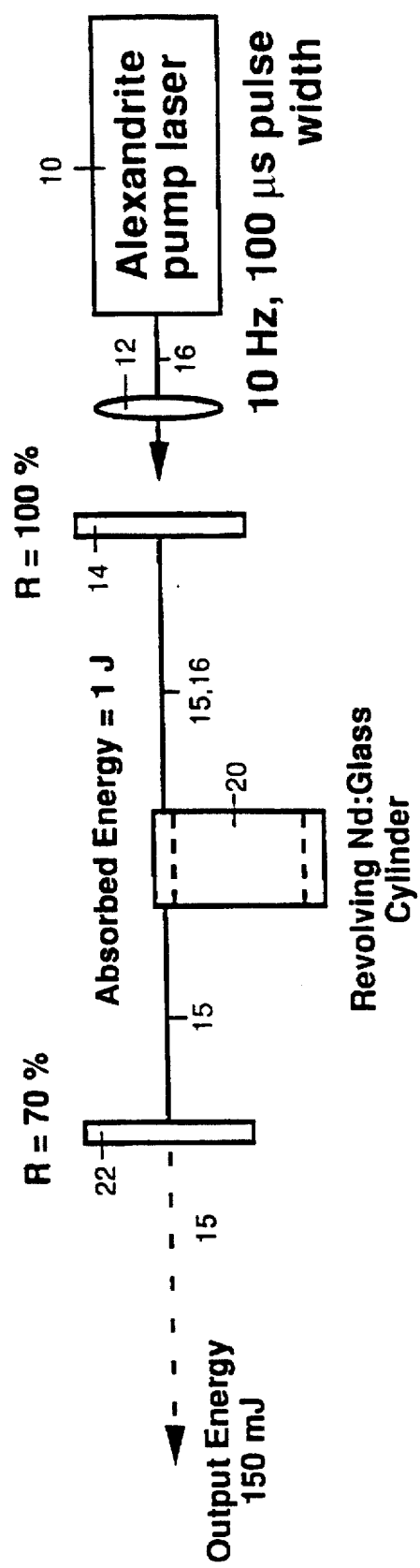
FIG. 1 shows a schematic of a system comprising an alexandrite pumped, revolving, Nd:glass cylinder lasant material. The schematic demonstrates use of the pump laser in combination with the revolving Nd:glass cylinder in a free running cavity wherein the Nd:glass absorbs 1 joule of energy from a 1.5 joule input pulse providing an output energy of 150 millijoules and generation of heat equivalent to the difference between the lasant wavelength, 1060 nm, and the pump wavelength, 764 nm, multiplied by the absorbed energy and divided by the lasant wavelength. Heat stored equals $((\lambda_l-\lambda_p)/\lambda_l)$ (energy absorbed).

The invention provides novel methods and apparatus for producing high power optical pulses at a high repetition rate, on the order of 10 per second. High average power is 10 to 1,000 watts. High repetition rate is 1 to 1,000 hertz. The invention overcomes problems encountered with conventional lasant media in conventional systems where undesirable effects of thermal lensing, thermal birefringence, higher order aberrations, and thermal fracture of the lasant media occurs at high power and high repetition rate.

In one aspect, the invention provides an improvement to a method for optical pumping of a body of lasant material where heat is generated and where emission of energy absorbed from the pump pulse occurs from the body of lasant materials. The pump pulse irradiation defines a beam path incident on or in the body of the lasant material and the lasant material is at an initial base temperature prior to the irradiation being directed or incident thereon. In the improvement, the method comprises irradiating a first region of the lasant material whereupon energy is absorbed from the pump pulse in the lasant material and such material becomes heated relative to the base temperature. The heated region is then cooled back to the base temperature before another pulse is directed thereon. Advantageously, the irradiating and cooling are conducted while relatively moving at least one of the body of lasant material and the beam path in order to position a region in the beam path during irradiation and then to position the region away from the beam path while it is being cooled. Desirably, the heat is removed at a rate approximately equal to the rate at which it is generated. It may be removed at a greater rate, a lesser rate of removal is less desirable. Desirably, when the lasant material and beam path are relatively moved to position an irradiated region away from the beam path, at the same time, another region of the media is positioned in the beam path for irradiation. This sequence is repeated so that while irradiation of one region is occurring, the cooling of another region is occurring. This sequence is repeated any number of desired times so that any region of the lasant material is at the base temperature before being positioned in the beam path for irradiation. The invention further provides adjusting the time period for irradiation of the lasant material so that irradiation is completed before a quantity of heat migrates from the irradiated region sufficient to cause temperature gradients which cause thermal distortion. The invention provides an essentially uniform, instantaneous temperature profile in the irradiated region of the material transverse to the direction defined by the lasant emission by use of selectively contoured, profiled, pump pulses.

In another aspect, the invention provides a system and a method for increasing the repetition rate of a high power laser or laser system. The invention comprises means for generating an optical pump pulse from a laser, diode, flash lamp, or other suitable source. The optical pump pulse is then directed to a selected region of a solid state lasant material. Energy from the pump pulse is stored in such lasant material and heat is generated. The stored energy is then extracted by an input pulse by stimulating emission from the solid state lasant material as in a chirped pulse amplification system described hereinabove. In this case, the selected irradiated region of a lasant media coincides with the lasing axis (beam path) of the input pulse from the CPA laser system. An essential feature of the invention is moving of the solid state lasant material in a manner that provides before the next optical pump pulse is received, a region of lasant material which contains no or minimal heat energy. Such new region is moved into the lasing axis and the previously pumped region is moved out of the lasing axis or beam path of the pump pulse. Preferably, the lasing axis is stationary with respect to movement of the lasant media. It is the lasant media that moves, preferably cyclically relative to the beam path. In the system and method of the invention, the motion cycle time, or round trip time, of the cyclically moving lasant media is sufficient to provide for heat to dissipate from the lasant media before a given irradiated region is then returned to the beam path. In other words, the motion cycle time of the lasant media is no less than and is preferable at least equal to or greater than the thermal decay time of the solid state lasant media. The thermal decay time is defined as the time it takes for the temperature at the center of the pumped region to decay to 1/e (0.37) of the initial temperature rise. By the method of the invention, it is possible to provide an essentially uniform or near uniform deposition of heat from the pump pulse onto the irradiated region of the lasant media, resulting in a uniform or essentially uniform temperature profile, whereby thermally induced distortions, such as thermal focusing and depolarization are minimized, reduced, and preferably eliminated. In the process of the invention, it is required that the total time for pumping and emission (amplifying of the input pulse from the CPA) be less than the time for temperature gradients to begin to form in the lasant media. In other words, the time for pumping and emission is less than the time for heat to dissipate resulting in a uniform or essentially uniform temperature profile and essentially no thermal distortions.

Before further describing the invention, the problem to which the invention is directed will be briefly described. In order to achieve high average power in lasers, the laser material, such as Nd:glass, are used to store a large amount of energy. Such materials are also referred to as lasant media, lasant material, and gain media. It is desired that the laser operate at a relatively high repetition rate. Nd:glass has the capability to store a reasonably large amount of energy, however, the repetition rate in Nd:glass lasers is limited due to the glass's low thermal conductivity. The low thermal conductivity results in detrimental thermal effects. The thermal effects can be divided into two groups, thermal fracture and thermal distortions. Thermal fracture of the glass is caused when the thermal induced stress is sufficient to physically damage the glass. Thermal distortions in the glass cause the beam to be non-diffraction limited. It is desirable to have a diffraction limited beam without any distortions in order to attain a tight focus to a small spot size to achieve high pulse intensity. However, with non-diffraction limited beam, a significant amount of energy is lost in the pulse wings. In a typical system, when lasant media is pumped by an optical pulse, the media, i.e. neodymium glass, stores energy within a portion of its volume. If the media remains stationary and subsequent pulses are delivered to the same region, heat accumulates. Such heat begins dissipating, that is moving out of the beam path, and forms a temperature gradient over the gain media. This gradient causes a non-uniform change in the index of refraction of the media. With the media hotter in the center, the center has a higher index so this effectively causes a thermal lensing effect since the index of refraction is weaker in material adjacent the center. The result is an undesired focusing of the beam which damages other components of the laser system. Therefore, conventional systems are undesirable because the same region of the lasant material absorbs a series of pump pulses, the temperature begins to rise, and a non-uniform temperature profile results in a non-uniformed index of refraction in the lasant material. The non-uniformed index of refraction profile causes thermal distortions which include thermal lensing, thermal birefringence, and higher order aberrations. Even assuming it were possible to reach a steady state condition at the elevated temperature, where it were possible to remove heat at the same rate at which it was being generated, a non-uniform temperature profile would still exist albeit a steady state one. Therefore, it is undesirable to operate with lasant material with a non-uniform temperature profile. Another type of manifestation of the distortion attributable to glass is that it causes a change in the polarization of the beam resulting in a loss of energy. This may be understood by returning to the analysis of the temperature profile in conventional glass material, the center is hot and the outer edge is cooler. Therefore, the center is expanding at a rate greater than the peripheral adjacent areas of the media. This causes thermal stress with vectors essentially in a radial direction, causing stresses in the tangential direction.

Accordingly, thermal stress is a function of the rate being higher at the center and lesser at the edge. This causes a shift in the index of refraction proportional to the stress. The component of stress that is perpendicular to the radial direction which also causes a change in the index of refraction with a different rate, thus causing rotation in the polarization. The difference in the change in the index of refraction in the respective directions causes rotation in the polarization of the input optical pulse, because when the pulse leaves an amplifier and is filtered by a polarizer for isolation, a portion of the beam energy is lost through the polarizers. This distortion is called thermal birefringence.

In order to avoid problems associated with thermal distortion, loss of energy, and destruction of system components, the invention provides a simple means for producing high repetition rate, high power pulses while avoiding thermal distortion and its attendant difficulties. The invention provides the ability to remove heat generated from the gain media (lasant material) and to repeatedly extract energy from the media without the accumulation of heat in the media which causes thermal distortions. The invention avoids thermal distortions by pumping an unheated gain region every time an optical pulse is incident thereon. In one aspect, the gain media is essentially uniformly pumped provided by a multi-mode oscillator. The resulting instantaneous uniform temperature profile does not create temperature gradients, thus, no thermal distortions occur. In the invention, the total time duration of pumping and lasing or amplification takes place while the temperature profile remains uniform in the region of the media in the beam path. Thus, no thermal distortions occur during the time of pumping and lasing or amplification. Heat is preferably extracted at about the same rate it is generated in the lasant material (media).

In one aspect, when an optical pulse is received in a region of the gain media, the change in temperature of the media is essentially localized to within the region defined by the optical pulse beam. This minimizes heating of any adjacent lasant media which is adjacent the heated region. In other words, the invention provides the ability to irradiate media with a pump pulse and then extract optical energy emission from the media from the irradiated region of the media, before heat migrates from the irradiated region of the media. In one aspect, a pump pulse is delivered during a time period of less than, for example 100 microseconds, the optical energy emission provided by the pump pulse is then extracted during a time period of less than 10 microseconds. Temperature gradients, characterizing heat migration, form more than 1 millisecond after initiation of the pump pulse delivery. As can be seen, the duration of pumping is on the order of $10^{-4}$ seconds, the duration of optical energy emission is on the order of $10^{-5}$ seconds, and the sum of these two intervals is less than 1 millisecond, $10^{-3}$ second, which is the time it takes for temperature gradients to begin to be evident.

Figure 3:
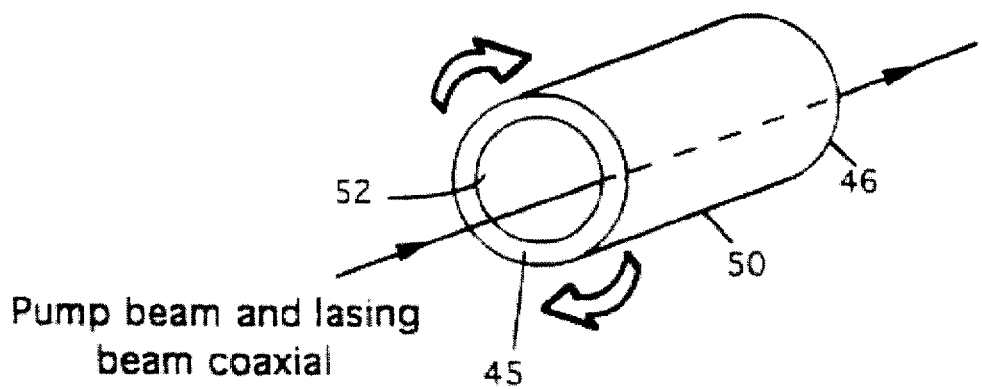
FIG. 3 is an illustration of a laser beam propagating through an end wall of a hollow glass cylinder lasant media; with the pump beam and lasing beam (input beam as from a CPA system) being co-linear (coaxial).
Figure 4:
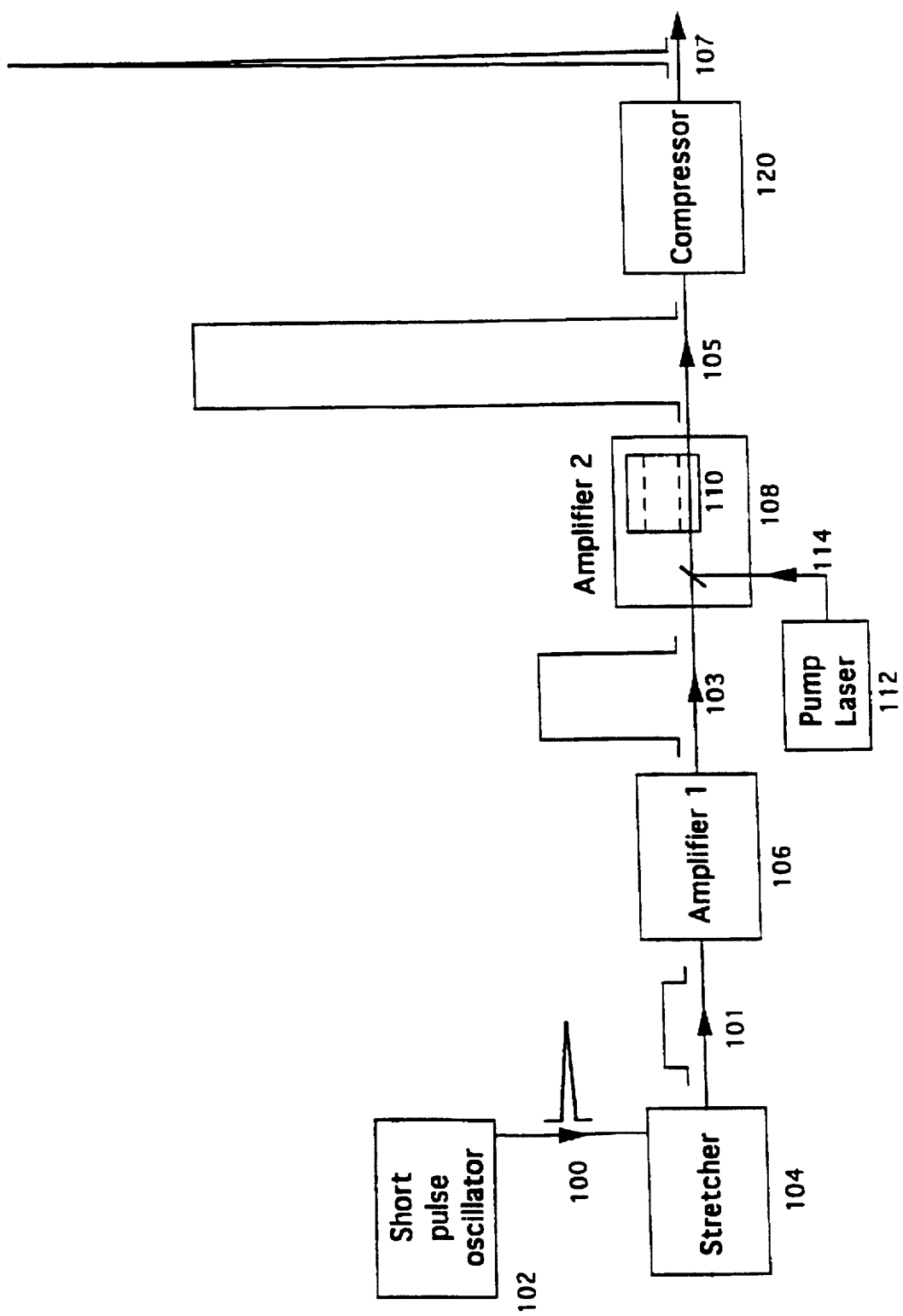
FIG. 4 shows a system for producing high peak power, ultrashort optical pulses at a high repetition rate in a CPA system which comprises the novel amplifier having the moving lasant material of the invention.
Figure 6:
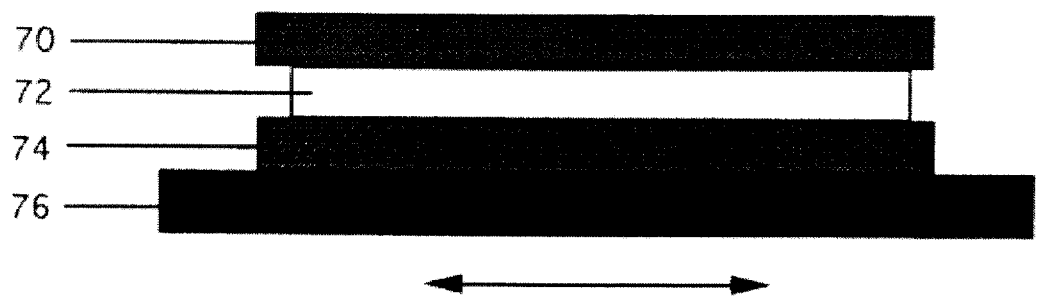
FIG. 6 is a schematic cross section view of an apparatus comprising a moving slab lasant medium. The apparatus also comprises heat sink material and means for linear translation of the slab.
Figure 7A:
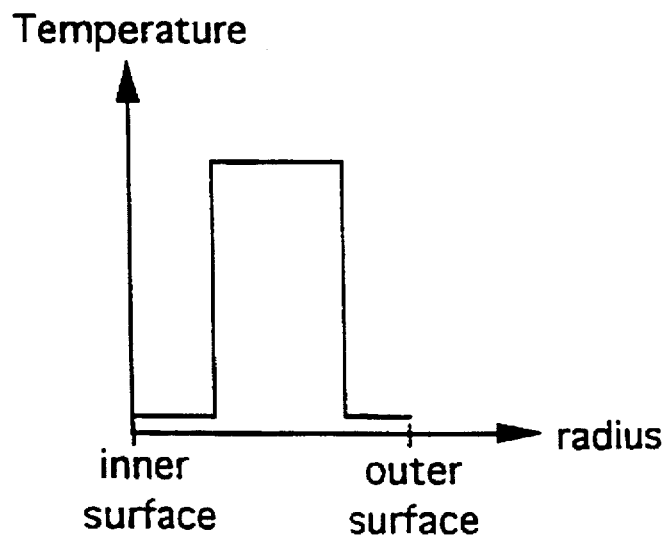
FIG. 7a shows a plot of a uniform temperature profile and FIG. 7b shows a cross section of a hollow cylinder with a uniform temperature profile in the region defined by the pump beam for co-linear pumping. The FIG. 7a is a plot of the temperature in the hollow cylinder lasant medium versus the radius of the hollow cylinder. The plot starts from the inner surface 52 of the hollow cylinder (FIG. 7b) and ends at the outer surface 50 of the hollow cylinder. The region 82 is defined by the pump beam for co-linear pumping over which a uniform temperature rise exists.
Figure 7B:
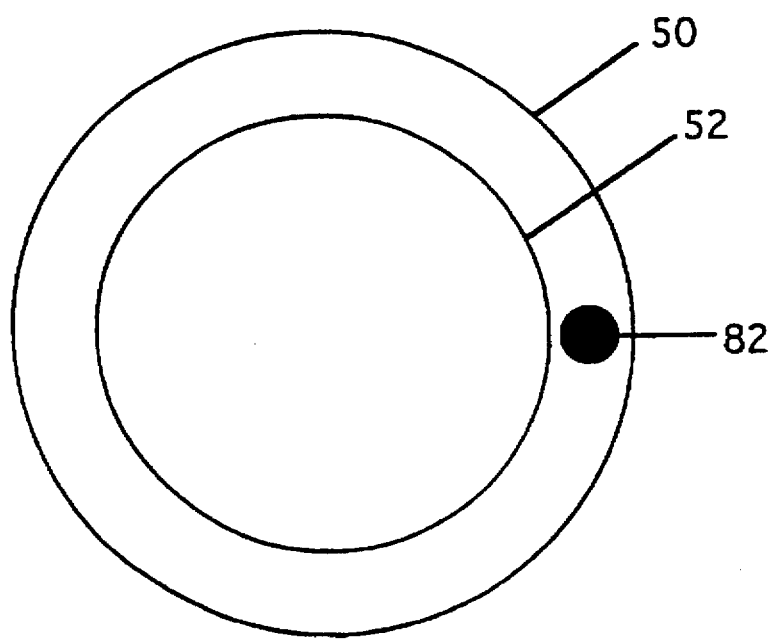
Figure 12:
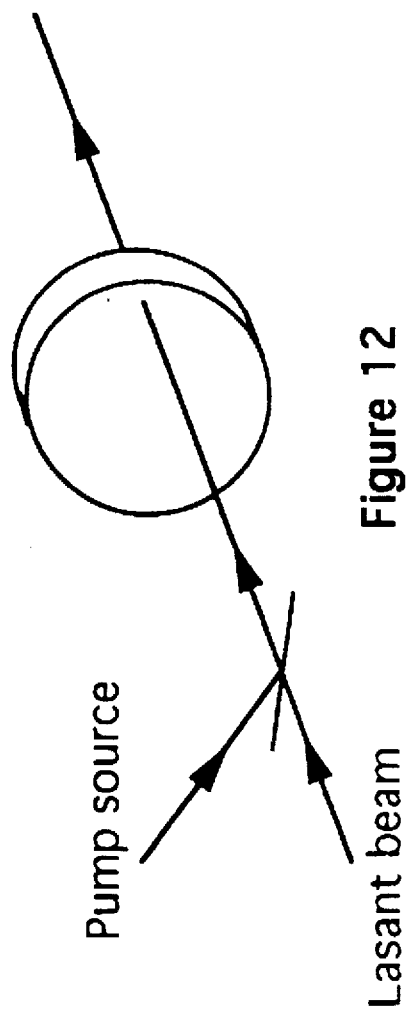
FIG. 12 shows the path of the pump beam from which energy is absorbed by the disk lasant medium and the path of the lasant emission beam where the two paths are co-linear for end pumping.
Figure 13:
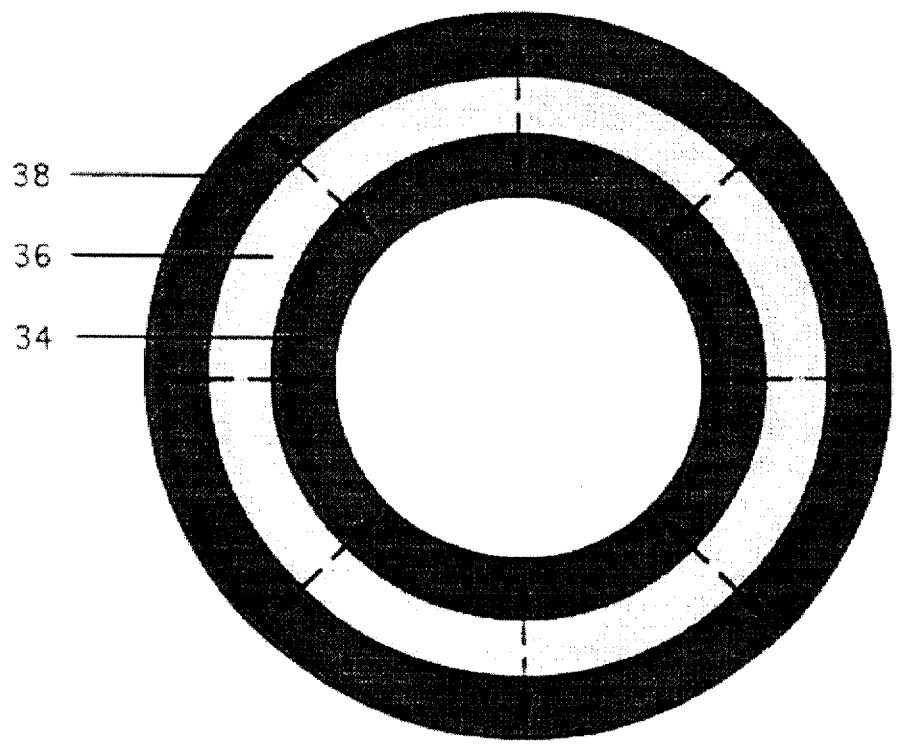
FIGS. 13, 14, and 15 show the heat flow from the lasant medium to the heat sink for a hollow cylinder, thin disk, and slab, respectively. The cylinder and slab of FIGS. 13 and 15 are in cross section.
Figure 14:
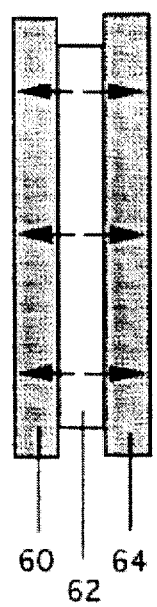
Figure 15:
Figure 16A:
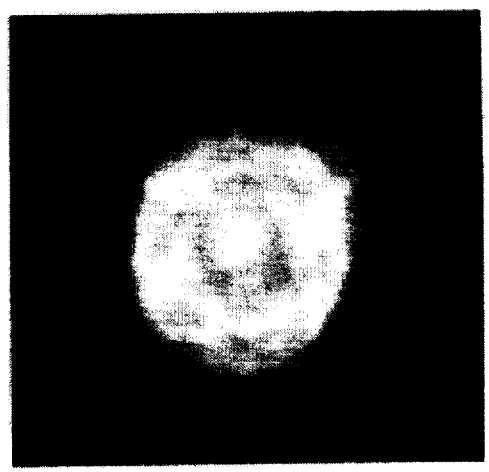
FIG. 16a shows the pump beam spatial profile at the incident face of the hollow cylinder.
Figure 16B:
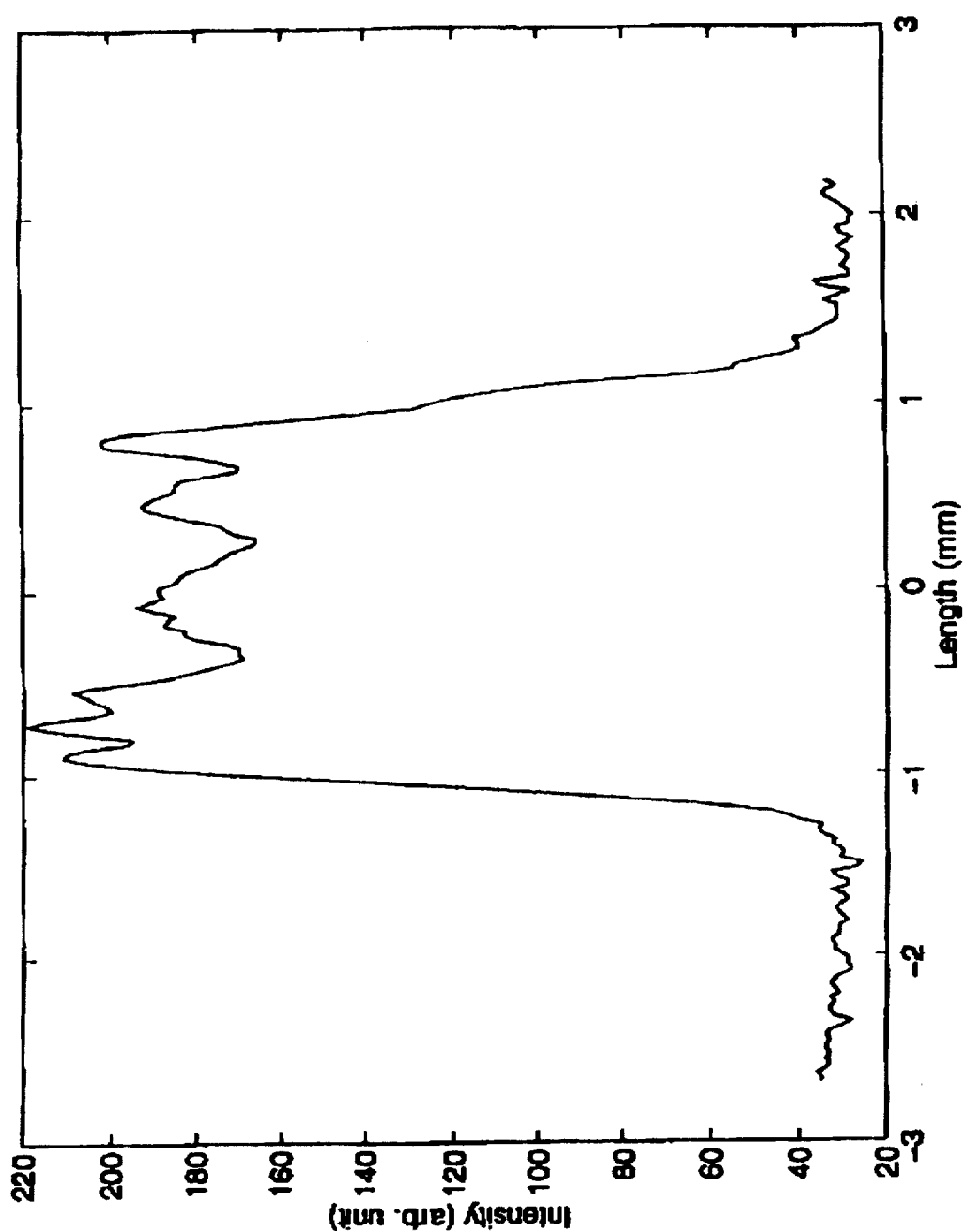
FIG. 16b shows the line out of the spatial profile near the center of the beam.
Figure 17:
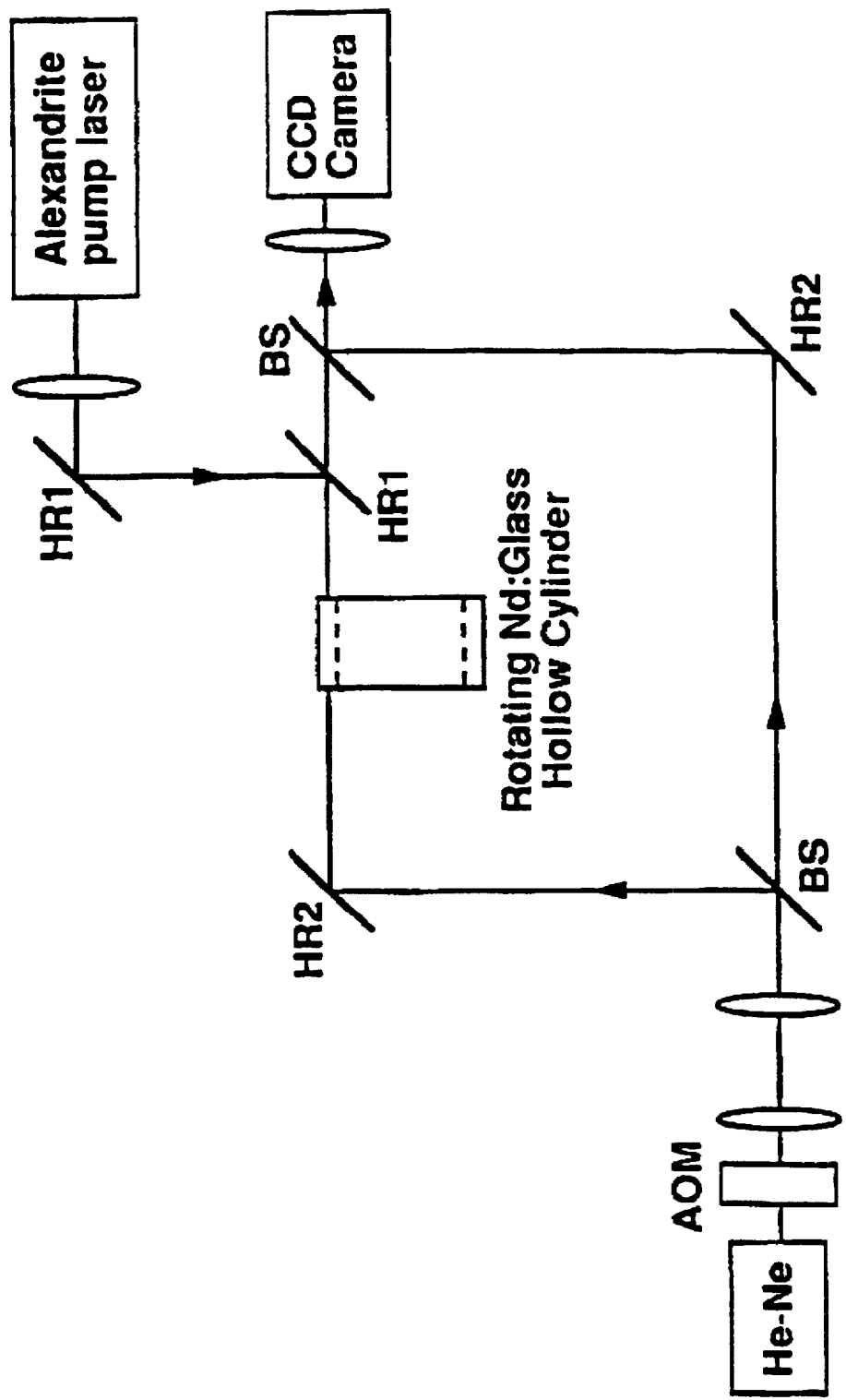
FIG. 17 shows the interferometer set up to measure the transient temperature profile. HR1's are high reflectors at 764 nm, HR2's are high reflectors at 632 nm. BS's are 50:50 beamsplitters at 632 nm, and AOM is the acousto-optic modulator.

The invention is operable with any number of pumping sources and is not limited by the selection of the optical pump pulse source. (FIGS. 1, 4, and 17.) Sources include flash lamp, laser, and laser diode. The only requirement is that the pumping of the lasant medium results in spatially uniform stored energy distribution transverse to the lasant beam path in the lasant medium. (FIGS. 2, 3, 5 through 15, 16, and 18.) If the energy is stored from the pump source in such a manner, the resulting heat load and, thus, instantaneous temperature profile will also be uniform in the direction transverse to the lasant beam path. Therefore, the lasant beam upon transmission through the lasant medium will only have a uniform change in the optical path length. The uniform change in optical path length will be due to the change in index of refraction with temperature and to the expansion of the lasant medium with temperature. No thermal distortions will be present while the uniform temperature profile remains. In one embodiment, high average power is achieved using Nd:glass lasers with flash lamps as the pump source. Laser pumping provides the advantage of increased extraction efficiency and decreased heat generation as compared to flash lamp pumping. Among the desirable choices for the pump laser are tunable alexandrite and Ti:sapphire free-running lasers. The preferred method to generate a uniform storage of energy distribution transverse to the lasant beam path is to laser pump the lasant medium co-linearly with the lasant beam path. If an oscillator is being constructed, the lasant beam path is the path defined by the cavity which contains the lasant medium. If an amplifier is being constructed, the lasant path is defined by the injected beam path incident on the lasant medium. Pumping co-linearly means that the pump beam path and the lasant beam path are the same. If the pump spatial profile incident on the lasant medium is uniform then the stored energy distribution will be uniform in the direction transverse to the lasant beam path. A uniform pumping spatial beam profile means that the intensity of the pump beam as a function of radius is constant as shown in FIG. 7. End (co-linear) pumping is shown in FIGS. 8, 10, and 12, and side pumping is shown in FIGS. 9 and 11. FIGS. 13 through 15 show direction of heat flow. The direction of heat flow is determined primarily on how the cooling for the lasant medium is arranged. The heat will flow through the lasant medium taking the shortest path to the thermally conductive heat sink as shown in FIGS. 13 through 15. Therefore, the heat flow is independent of how the heat was deposited. In other words, the pumping of the lasant material can be colinear or side pumped, but the direction of heat flow will be determined by the cooling apparatus. The uniform pump spatial beam profile is generated from a multi-mode oscillator. A superposition of the multi-modes results in a uniform intensity distribution in the near field. The uniform profile can be further enhanced by placing an internal aperture in the cavity or by using the lasant rod medium as an aperature to truncate the spatial profile. The truncation by the aperature results in a sharper rising edge for the spatial profile. This uniform spatial profile exists only in the near field of the pump oscillator cavity and, thus, must be imaged to the lasant medium for which the uniform profile is required in this embodiment.

The Ti:sapphire laser is a more efficient laser and can be tuned to higher wavelengths than alexandrite. The tunability to higher wavelength allows for pumping into absorption bands closer to the lasing transition of the medium. The heat in laser media from optical pumping arises due to the difference in energy levels between the absorption transition and the lasing transition. Therefore, the closer the pump wavelength is tuned to the lasing wavelength, the less heat will be generated in the lasing media. The most desired laser media are Nd:glass and Yb:glass. Nd:glass has been the conventional medium of choice for high energy lasers due to its large storage capability. For the first time, Yb:glass is used to store a large amount of energy, greater than Nd:glass. It has been found that Yb:glass has an upper state lifetime of about 2 milliseconds, approximately a factor of 4 to 7 greater than that of Nd:glass. This allows for easier, longer, storage of energy. Yb:glass also has a higher saturation fluence resulting in a more compact laser. Another advantage of Yb:glass as compared to the conventional Nd:glass is that the Yb:glass has absorption transitions closer to its lasing transition. Thus, the Ti:sapphire pump laser is well suited to pump Yb:glass, decreasing the heat load as described above.

Laser diode pumping is an efficient and compact method for pumping the lasant medium. In order to attain a uniform spatial transverse profile from a laser diode, the diode can be coupled to a fiber to mix the modes resulting in a uniform spatial profile as accomplished by Dimmick (Ref: T. E. Dimmick, Optics Letters, Vol 15, p. 177, 1990). The lasant medium can then be co-linearly pumped as described above for laser pumping. Another method for uniform pumping with laser diodes combines laser diodes with reflectors. The reflectors which surround the lasant medium allow for multipassing the pump beam through the lasant medium. Thus, allowing for low uniform absorption of the pump energy.

Figure 2:
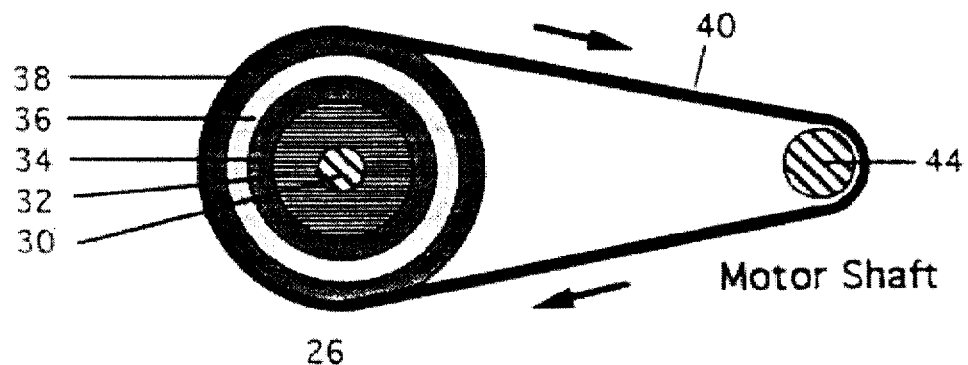
FIG. 2 is a schematic of an apparatus in cross section comprising a revolving hollow cylinder lasant medium. The apparatus also comprises heat sink material and means for rotation of the hollow cylinder.

In a broad aspect, the invention provides a moving media pumped by an optical pulse. In one of its more basic aspects, the invention provides a laser pumped Yb:glass media moving relative to the laser pump beam in a free running cavity. The Yb:glass absorbs 1 joule of energy from an optical pump beam pulse having an initial 1.5 joules of energy using a repetition rate of 10 hertz (10 pulses per second) and a pulse width (pulse duration) of 100 microseconds as shown in FIG. 1. It is preferred that the moving media be a revolving glass cylinder as shown in FIGS. 1 to 3. However, other shapes are usable, such as, moving slab or disk.

Referring to FIG. 1, there is shown an alexandrite pumped, revolving, Nd:glass cylinder material. FIG. 1 depicts the schematic of the first laser incorporating the technique of the invention to remove thermal distortions. The output energy is limited by the available pump energy. The alexandrite pump laser 10 operates at 10 hertz, and produces pulses each having 100 microseconds pulse width, and an energy of 1.5 joules (J). The pulse generated by the alexandrite pump laser 10 follows a beam path 16 imaged through lens 12, and through mirror 14 having a transmittance of 90 percent at the pump wavelength of 764 nm and a reflectance of 100 percent at the emission wavelength of Nd:glass of 1060 nm. Then the beam path 16 travels through moving and cooled Nd:glass media in the form of cylinder 20. When beam 16 traverses through cylinder 20 approximately 1 joule of energy is absorbed by the glass material. The lasant path 15 and pump beam path 16 are co-linear. The lasant path 15 and pump beam path 16 inside the laser cavity are defined by the two mirrors 14, 22 and contain the lasant medium 20. Mirror 22 reflects 70 percent of the energy at the emission wavelength and transmits 30 percent of the energy. The transmitted energy from mirror 22 is the output where 150 millijoules (mJ) per pulse was measured. This shows the ability of the Nd:glass to effectively absorb and store 1 joule of energy at a repetition rate of 10 Hz in a 2.4 mm diameter, because heat related distortions are avoided by a revolving glass cylinder configuration and cooling means as shown in FIG. 2. This invention is not limited to an alexandrite pump laser 10. The source of pump pulse may be from a variety, such as, diodes, flash lamps, or Ti:sapphire laser.

FIG. 2 shows a cross sectional view of an apparatus 26 comprising a revolving hollow cylinder lasant media. Such cylinder is preferably an Nd:glass or Yb:glass cylinder. Referring to FIG. 2, the moving lasant media apparatus 26 comprises a number of components. Beginning from the interior, there is shown a metal shaft 30, a bearing 32, a heat sink copper interior lining 34, Nd:glass cylinder 36, and an exterior heat sink copper metal sleeve 38. It is preferred that hollow glass cylinder 36 be slightly longer than metal sleeve 38 and metal liner 34, in order to provide ease of cleaning the end wall surfaces of the glass. The media is rotated by belt 40 driven by shaft 44 which is attached to a motor (not shown). It has been found that in the case of a 1.5 joule, 10 hertz, 100 microsecond pulse, as per FIG. 1, that the revolving hollow Nd:glass cylinder 36 is suitably sized having a 4 millimeter wall thickness, a 4 centimeter outer radius, and is 3 centimeters long. The exterior heat sink sleeve 38 is about 5 millimeters thick and has an outer radius of about 4.5 centimeters. The interior copper lining 34 is about 5 millimeters thick and has an outer radius of about 3.5 centimeters. Although the interior lining 34 and the exterior copper sleeve 38 may each be coextensive with the glass 36, there is an advantage to them (34, 38) being slightly shorter than glass 36 in order to providing cleaning of the glass end walls 45, 46 (FIG. 3). In another embodiment, the glass media 36 is cooled by a thermally conductive sleeve and a thermally conductive interior lining in place of the copper lining 34 and sleeve 38. Sapphire or diamond is a suitable heat sink. Sapphire and diamond are advantageous in that they can be fabricated to be optically transparent, thus, allowing for side pumping as in FIG. 9. In another embodiment, a cool liquid or cool gas may be moved in heat transfer relationship with the exterior surface 50 of the hollow Nd:glass or Yb:glass media and/or in heat transfer relation with the interior 52 of said hollow cylinder medium 36. In another embodiment, a cool liquid or cool gas may be moved in heat transfer relationship with metal sleeve 38 and/or metal sleeve 34.

Referring again to FIG. 3, there is shown a view of a laser beam propagating through the wall 45 of the hollow cylinder lasant medium 36. In FIG. 3, the pump beam and lasing beam are co-linear. The direction of rotation of the cylinder is also shown.

In still another aspect, the novel pumped (irradiated), cooled, and moving high repetition rate media 36 is used as an amplifier in a laser system and preferably is used as the second stage of amplification in a chirped pulse amplification (CPA) laser system as shown in FIG. 4. FIG. 4 shows a system for producing high peak power ultrashort optical pulses at a high repetition rate. The energy is at least 100 mJ and preferably on the order of 0.1 to 100 joules, the pulse width (duration) is at most 1 picosecond, and preferably about 30 femtoseconds to 100 femtoseconds, and the repetition rate is at least 1 hertz and preferably about 1 to 1000 hertz. In the basic method for operating the apparatus of FIG. 4, an input optical pulse 100 is generated by an oscillator 102 and then is stretched in time by stretcher 104. Oscillator 102 is preferably Ti:sapphire or Nd:glass. The oscillator 102 produces a series of pulses 100 desirably at a rate of 100 megahertz where each pulse has an energy of approximately 1 nanojoule and a pulse width (duration) of approximately 100 femtoseconds. The oscillator 102 is not limited and may be Ti:sapphire, Nd:glass, or Yb:glass type. The Nd:glass and Yb:glass are examples of lasant materials which can be pumped by diode lasers. This leads to a compact and efficient short pulse oscillator capable of producing pulse durations less than 200 femtoseconds. Kigre Inc. and Hoya Corp. are vendors of Nd:glass and Yb:glass. Stretcher 104 is preferably comprises mirrors and a pair of gratings arranged to provide positive group velocity dispersion. The stretcher is optimal and the amount the pulse is stretched depends on the amount of amplification. The pulse enters the stretcher 104 where it is stretched in time and the output is at approximately 10 hertz and a duration of approximately 1 to 10 nanoseconds. The time stretched pulse 101 is then amplified.

The pulse 101 leaving the stretcher 104 is then preferably amplified with two stages of amplification. A first stage is preferably a regenerative amplifier 106 which takes the pulse to a 1 millijoule level. Preferably the first stage amplifier 106 contains a medium which is Ti:sapphire, Nd:glass, or Yb:glass. In one configuration, the regenerative amplifier 106 configuration comprises an optical resonator that contains the gain media glass, a Pockel's cell, and a thin filmed polarizer. An example of an experimental set-up showing a Ti:sapphire regenerative amplifier in a CPA system is described by Squier, Mourou, et al in Optics Letters, Volume 16, No. 5, pages 324–326, Mar. 1, 1991. The pulse 103 obtains an energy of approximately 1 millijoule and then enters the second stage of amplification. The second stage amplifier 108 preferably comprises a high gain lasant material 110 which is cooled and an oscillator 112 which provides a pump beam 114. The pump oscillator 112 is a free running laser producing pulses of durations preferably less than 200 μs and with an energy in the range of 1 to 100 joules. The preferred lasant medium is Ti:sapphire, alexandrite, or Cr:LiSAF. Light Age is a vendor producing alexandrite lasers and ELIGHT is a vendor producing Ti:sapphire lasers. The second stage amplifier 108 also has means for relative movement between the media and the pump beam. Preferably, the media moves relative to the pump beam. This second stage amplifier 108 is preferably of the same configuration or similar to the configuration described above with respect to FIGS. 1 through 3. The input pulses 103 will make at least one pass through the lasant material 110. Preferably, the pulses 103 will make multiple passes through lasant material 110 in order to extract maximum amount of energy. The second stage amplifier provides increased energy for input beam of pulses 103. The pulses 105 leave the second amplification stage 108 at a frequency of 10 hertz and an energy level of 100 millijoules to 10 joules; optionally, the pulses 105 are compressed preferably to pulse 107 with duration of at least 400 femtoseconds in compressor 120. As can be seen from the description of the system of FIG. 4, the mechanism for amplification is via a pump optical pulse 114 which pumps gain media 110 in the second stage amplifier 108.

When the gain media 110 is pumped by the pump optical pulse 114, energy is stored in the gain media 110. Thereafter, the input pulse 103 extracts energy from the media 110. The energy extraction via the stretched input pulse 103 extracts energy without damaging the media, since the stretched pulse 103 has a longer pulse width relative to its initial condition 100, thus avoiding high intensity in the gain media 110. Accordingly, by the apparatus of FIG. 4, the gain media 110 of amplifier 108 is pumped by a flat top pulse 114 which causes an instantaneous response in the glass of the gain media 110. This instantaneous response provides an essentially uniform instantaneous temperature profile in the irradiated region of the media. The irradiated region of the medium will have essentially the same profile as the pump pulse 114. As stated earlier, the pump laser 112 is multi-mode meaning that it does not have a Gaussian beam profile typical of a single mode laser. In contrast, the multi-mode is a summation of several modes which is then effectively cut by an aperture in the cavity of the laser 112 providing a pump pulse 114 with a roughly flat spatial intensity profile. With the instantaneous temperature profile created in the gain media by the multi-mode flat pump pulse, the media responds so as to avoid thermal distortions as there is no change in temperature over the pulse beam meaning that the end result is the index of refraction as a function of beam spot radius is constant. This avoids a lensing or birefringence effect as there is no change in temperature profile across the beam spot projected on the media.

In the method of the invention, input optical pulses 100 are generated having a laser pulse width in the nanosecond to femtosecond range using a chirped pulse amplification (CPA) laser system. The basic configuration of such a system is further described in U.S. Pat. No. 5,235,606 which is incorporated herein by reference in its entirety. Chirped pulse amplification systems have been also described in a publication entitled *Laser Focus World* published by Pennwell in Jun. of 1992. The illustrative examples describe above generally pertain to pulse energies in the 0.1 joule to 100 joule range, pulse widths in the range of 100 femtoseconds to 1 picosecond, repetition rate in the range of 1 hertz to 1,000 hertz, and the wavelength on the order of 1.06 microns. But these examples are merely illustrative and the invention is not limited thereby.

In contrast to the above improved system, if the media were stationary, then over time the effect of thermal build-up causes an effect and heat starts to migrate or dissipate from the center of the irradiated region (beam spot). As a result, the temperature profile in the irradiated region changes the index of refraction of the media changes, and the beam is distorted. To avoid such problems, the apparatus of FIG. 4 contains a media as per exemplary FIGS. 1 through 3 which is moved and cooled so that any region of the media in the beam path is at a temperature condition equivalent or close to that prior to initiation of irradiation. In other words, any region is cooled to about an initial base temperature condition prior to again being irradiated. The initial base temperature is typically an ambient condition corresponding to room temperature, for example, 27° C. to 37° C. In the case where the media is in the form of a cylinder, the cylinder is rotated at a rate which provides a motion cycle time (one round trip) to be no less than, and preferably greater than, the time for heat to dissipate from the solid laser media, the thermal decay time.

Figure 5:
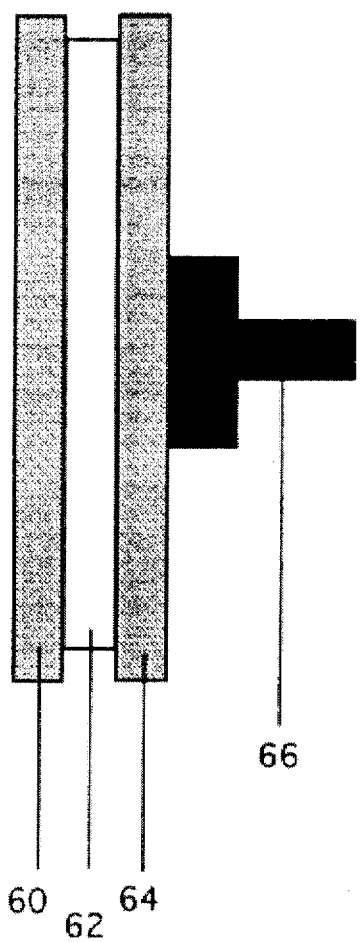
FIG. 5 is a schematic side view of an apparatus comprising a rotating disk lasant medium. The apparatus also comprises heat sink material and means for rotation of the disk.

FIG. 5 shows a side view of an apparatus comprising a rotating disk lasant medium. Beginning from the left, an outer transparent sapphire heat sink 60, Nd:glass disk 62, and an outer transparent sapphire heat sink 64. The apparatus is attached to a motorized rotation stage 66. In another embodiment, a cool liquid or cool gas may be moved in heat transfer relationship with the outer heat sink 60 and/or outer heat sink 64. FIG. 6 shows a cross sectional view of an apparatus comprising a moving slab lasant medium. Beginning from the top, an outer copper heat sink 70, Nd:glass disk 72, and a bottom copper heat sink 74. The apparatus is attached to a motorized linear translation stage 76. In another embodiment, a cool liquid or cool gas may be moved in heat transfer relationship with the upper surface of the slab 72 and/or the bottom surface of the slab 72. In another embodiment, a cool liquid or cool gas may be moved in heat transfer relationship with the outer heat sink 70 and/or bottom heat sink 74.

EXAMPLE

In this example, there is described a technique consisting of three steps for the removal of thermal distortions. The first step requires pumping the laser medium with a uniform transverse spatial profile. For a uniform transverse pump spatial profile, the initial temperature profile will also be uniform. Therefore, the second step requires that pumping and lasing of the laser medium must occur while the resulting uniform temperature profile exists. Thus, the pump pulse duration must be sufficiently short enough so that a non-uniform temperature profile does not have time to form. Finally, the heated region must be moved away from the lasing path and a cooled region moved into the lasing path before the next pump pulse arrives. Since a cooled region is pumped on every shot, there is negligible build up of thermal effects, effectively reducing the thermal effects to single shot thermal effects. For a uniform temperature profile, the single shot thermal effects are limited to a uniform increase of the optical path length through the laser medium, thus, no thermal distortions are present during lasing. This technique is demonstrated by pumping a rotating Nd:glass hollow cylinder with a uniform spatial beam profile imaged from a free running alexandrite laser.

To insure that the pumped region has been sufficiently cooled, the time for one revolution is required to be greater than the thermal decay time. The thermal decay time is defined as the time it takes for the temperature at the center of the pumped region to decay to $1/e$ of the initial temperature rise. The thermal decay time depends on the cooling conditions, which are difficult to model. The thermal time constant, which depends only on material properties, will be used as an approximation for the thermal decay time, as is commonly done in the literature. Assuming the cylinder can be treated as a slab with thickness, t, the thermal time constant is given by:

$$\tau = Cp/k \, (t/\pi)^2 \tag{1}$$

where C is the specific heat, p is the density, and k is the thermal conductivity of the glass host. For Q-246 Nd:silicate glass with $t=0.4$ cm, $\tau=2.56$ s. The lower limit for the time for one revolution, T, is set by $T>\tau$.

To insure that no diffusion of heat occurs to the currently pumped region from the previously pumped region, the currently pumped region must be sufficiently displaced from the previous pumped region. This condition determines the upper limit for T. Heat will prefer to flow towards the cooled walls of the glass hollow cylinder, thus, minimal flow of heat to the next pumped region is expected. For a pump beam size of 2.4 mm, an outer diameter of the hollow cylinder of 4 cm, and a laser repetition rate of 10 Hz, $T<5.2$ s. For the experiment, 5 s was chosen as the time for 1 revolution.

An uncoated 2 weight percent Nd:silicate glass (Kigre Q-246) hollow cylinder was fabricated to the dimensions of an outer diameter of 4 cm, a wall thickness of 0.4 cm, and a length of 2.8 cm. The glass cylinder was mounted on a copper cylinder which in turn was mounted on ball bearings. The cylinder assembly was rotated by a belt attached to a motor. The glass was simply cooled by blowing nitrogen gas over the outer surface of the cylinder away from the lasing beam path. The pump laser was a free running alexandrite laser (Light Age PAL 101) with a pulse duration of approximately 150 μs, suitable for the fluorescence lifetime of 400 μs for Nd:silicate glass. For a revolution time of T=5 s, the hollow cylinder moves less than 0.0016 of the pump beam diameter of 2.4 mm during the pump pulse duration. The alexandrite laser produced a multi-mode output of 2 joules per pulse at 10 hertz. The pump wavelength was tuned to 764 nm, resulting in 80 percent of the incident pump energy absorbed in the Nd:glass. The required uniform pump spatial profile is obtained by imaging from the end face of the alexandrite rod to the face of the Nd:glass cylinder. The pump spatial profile and line out measured at the glass cylinder are shown in FIGS. 16a and 16b. The pump beam diameter of the glass cylinder was measured to be 2.4 mm. The imaged pump beam maintains its size and uniform spatial profile over approximately 3 cm.

Figure 18A:
FIGS. 18a and 18b show interferograms imaged from the exit face of the hollow cylinder.
Figure 18B:

In order to demonstrate that the resulting transient temperature profile in the Nd:glass hollow cylinder was uniform during the time of lasing, a Mach-Zehnder interferometer was built as shown in FIG. 17. For a uniform temperature profile, a uniform increase in the optical path length is expected, due to thermal expansion of the glass and due to the thermal induced change in the index of refraction. The transient temperature profile can be inferred from the interferogram since the temperature profile is proportional to the change in optical path length profile related by:

$$\Delta(n_o L) = n_o(l_o \alpha_1 + L\alpha_n)\Delta T \tag{2}$$

where $n_o L$ is the undistorted optical path length, $l_o$ is the length over which expansion takes place at the end face of the cylinder, $\alpha_1$ is the thermal expansion coefficient, and $\alpha_n = (1/n_o)(dn/dT)$ is the thermal coefficient of refractive index. The He-Ne laser was chopped to a 10 μs pulse width and synchronized using the acousto-optic modulator to arrive at the end of the pump pulse. The He-Ne beam was also expanded and collimated to a beam diameter of 1 cm. The interferograms shown in FIGS. 18a and 18b show a 6 mm section of the Nd:glass cylinder centered around the pump beam. The interferograms in FIG. 18 were produced by imaging from the exit face of the glass cylinder to the camera. In FIG. 18b, the interfering beams were slightly tilted with respect to one another to generate the horizontal fringes. FIG. 18a shows the distortions present while the hollow cylinder is stationary and pumped for approximately 3 s at 10 Hz. FIG. 18b shows the interferogram while the hollow cylinder is moved and pumped with the same energy per pulse as in FIG. 18a. In FIG. 18b, the circle indicates the region over which the current pump pulse synchronized with the He-Ne pulse was incident. In FIG. 18b, a roughly half wave uniform increase over the pumped region was observed. The uniform increase demonstrates that lasing occurs with negligible thermal distortions present. Solving for ΔT in Equation 2, the half wave increase corresponds to a six degree increase in temperature for 1 joule of absorbed pump energy. The glass was rotating in a counter clockwise motion (moving upwards in FIG. 18). The flat (straight) fringes located below the pump beam indicate that this portion of the glass moving into the lasing path has been sufficiently cooled. Thus, T=5 s is sufficient time for a pumped region to cool. Above the pumped region, the thermal gradients have formed, indicated by the parabolic shaped fringes. For efficient extraction of the stored energy, the ratio of the area over which a uniform temperature profile exists to the area of the pump beam is of importance. The pump beam diameter at the glass was measured to be 2.4 mm, while the diameter of the area of uniform temperature profile was measured to be 2.1 mm, corresponding to a ratio of the areas of 0.77. By improving the imaged pump beam quality and using a shorter pump pulse duration, this ratio can be improved.

Figure 19:
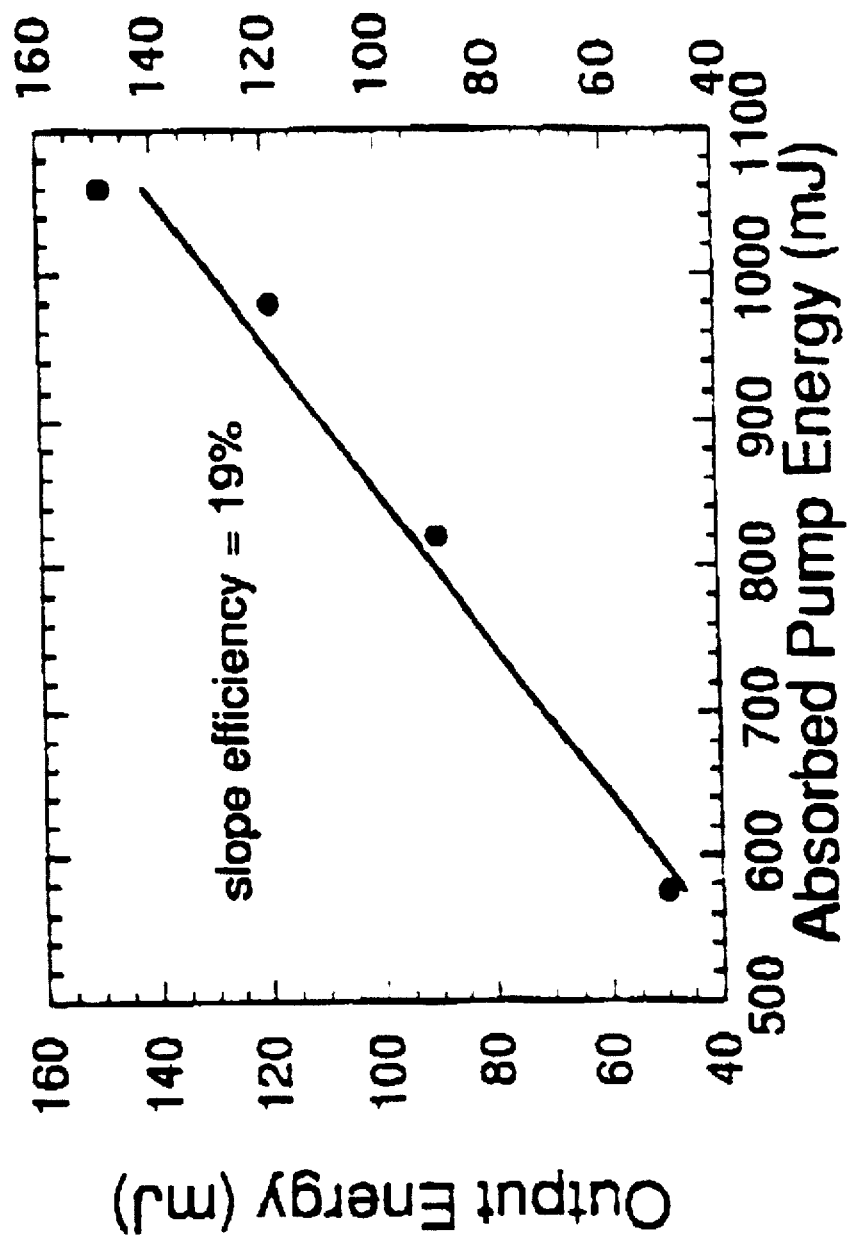
FIG. 19 shows the laser output pulse energy of the rotating hollow cylinder laser cavity shown in FIG. 1 versus absorbed pump pulse energy at a 10 hertz repetition rate.

To measure the extraction efficiency, a simple cavity consisting of a flat high reflector and a flat 70 percent output coupler, was constructed around the hollow cylinder. The cavity's length was 56 cm long and the glass was placed 18 cm from the high reflector. The pump beam was imaged onto the Nd:glass cylinder as described above for the interferometer. The output from the free running cavity was multimode operating at a 10 hertz repetition rate. The maximum output energy was 150 mJ for 1 J of absorbed energy. A slope efficiency of 19 percent was measured as shown in FIG. 19. The slope efficiency and overall efficiency can be improved by anti-reflection coating the hollow cylinder.

Concerns over misalignment as a result of rotating the laser medium has been discussed by Korn (J. Korn, T. H. Jeys, and T. Y. Fan, Optics Letters, Vol. 16, p. 1741, (1991)).

Measurements of the wedge of the cylinder revealed 53 μrad, which is much less than the expected divergence from the output of the laser cavity built around the rotating hollow cylinder. The effect of wobble is to displace the gain region and was minimized since the hollow cylinder is at normal incidence to the cavity axis.

This technique to remove thermal distortions can be applied to any laser medium suffering from thermal distortions. Nd:glass and Nd:YAG are two common laser media used for high average power lasers. Yb:glass and Yb:YAG are two promising media due to their low quantum defects, resulting in relatively low heat loads. The geometry of the moving laser medium is preferred to be a hollow cylinder, but can be a rectangular slab or cylindrical rod. The pump source can be either flashlamp, laser, or diode laser as long as the illumination of the laser medium is spatially uniform and sufficient absorption of pump energy occurs while the resulting uniform temperature profile exists. In order to attain a uniform spatial profile from a laser diode, the diode can be coupled to a fiber to mix the modes as accomplished by Dimmick. Another method for uniform pumping with laser diodes combines laser diodes with reflectors.

An application of this technique would be to increase the repetition rate of high peak power laser systems. Current high peak power Nd:glass laser systems implementing chirped pulse amplification have been limited to less than a 1 W of average power while delivering multi-terawatt peak power pulses. Yb:glass has tremendous potential to serve as a high peak power and high average power laser medium. The broad gain bandwidth of Yb:glass has been shown to be sufficient for the amplification of ultrashort pulses. The low emission cross section of Yb:glass allows for an increased stored energy density in addition to the high energy storage properties of glass discussed earlier. The low quantum defect of Yb:glass coupled with this technique to remove thermal distortions will lead to a significant increase in the average power of high peak power lasers.

In conclusion, a simple technique for the removal of thermal distortions has been demonstrated. The required uniform temperature profile during the time of lasing has been measured with an interferometer. The interferograms show that the pump pulsed duration of 150 μs is sufficiently short enough so that lasing can occur before a non-uniform temperature profile forms. Limited by the maximum output from the pump laser, 1.5 W of average power was extracted from the rotating Nd:glass hollow cylinder. This technique, along with chirped pulse amplification, advantageously increases the average power of high peak power laser systems based on Nd:glass and Yb:glass.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. In a method for passing optical radiation in the form of optical pulses through a lasant material for optically pumping said lasant material where heat is generated and emission occurs from said material, said radiation defining a beam path, and said lasant material being at an initial base temperature prior to said radiation being passed therethrough, the improvement comprising:

a. irradiating a region of said lasant material by directing one of said pulses onto said region, causing said region to be heated to an increased temperature relative to said base temperature;

b. cooling said heated region to about the base temperature;

c. relatively moving at least one of said material and said beam path to position another region of said material in said beam path; and d. repeating steps (a), (b), and (c) in a sequence that provides any region of said lasant material at said base temperature before positioning in said beam path.

2. The method according to claim 1 wherein said beam path is stationary and said material is moved relative to the beam path.

3. The method according to claim 2 wherein said material is moved essentially continuously.

4. The method according to claim 2 wherein said material is a cylinder which is rotated, and the motion cycle time of said cylinder rotation is not less than the thermal decay time of said material.

5. The method according to claim 4 wherein said pulse is directed to said region and then essentially complete cooling of said region to said base temperature occurs before said region is rotated back in to said beam path.

6. The method according to claim 1 which further comprises: adjusting the time period for irradiation of said material so that said irradiation is completed before a quantity of heat migrates from said irradiated region sufficient to cause thermally induced optical distortions.

7. The method according to claim 1 wherein said pulse provides an essentially uniform, instantaneous temperature profile in said irradiated region of said material in a direction transverse to a path defined by said emission occurring from said material.

8. The method according to claim 1 wherein said lasant material is in the form of a body having an outer surface and a thickness, said beam path defines an axis through said outer surface, said cooling is conducted by transfer of heat from said irradiated region in a direction along said axis.

9. The method according to claim 1 wherein said lasant material is in the form of a body having an outer surface and a thickness, said beam path defines an axis through said thickness, said cooling is conducted by transferring heat from said irradiated region in a direction transverse to said axis.

10. In a method for increasing the power of optical pulses which comprises: generating optical pulses, amplifying each of the optical pulses in amplifying material by combining the optical pulse with optical energy emission, said emission produced by a respective pump pulse incident on the amplifying material which generates heat in the material in a region defined by a beam path of said pump pulse, where such heat dissipates from said region, the improvement comprising: irradiating a region of said material with said pump pulse and extracting said optical energy emission from said material before a quantity of generated heat migrates from said region sufficient to cause thermally induced optical distortions, whereby a change in temperature in said material is essentially localized within said region during said irradiation and extraction.

11. The method according to claim 10 wherein said amplifying material is glass and wherein said pump pulse is delivered during a time period of less than 100 microseconds ($10^{-4}$ second); said optical energy emission is then extracted during a time period of less than 10 microseconds ($10^{-5}$ second); and thermal gradients characterizing said heat migration form more than 1 millisecond ($10^{-3}$ second) after initiation of said pump pulse delivery.

12. An apparatus for producing high repetition rate, high average power optical pulses which comprises:

a. means for generating a series of optical pulses;

b. means for stretching each of the optical pulses in time;

c. means for amplifying each of the time stretched optical pulses comprising:
  i. an oscillator which generates a pump pulse defining a beam path;
  ii. a lasant material in the beam path of the pump pulse, said lasant material characterized by an ability to absorb energy from said pump pulse when irradiated by said pump pulse;
  iii. cooling means for removing heat from said lasant material; and
  iv. moving means constructed and arranged to move said lasant material relative to said beam path to position a first region of said material in said beam path during said irradiation, and to position said first region away from said beam path during cooling of said first region while positioning a second region in said beam path for irradiation; and d. means for compressing each of the amplified pulses.

13. The apparatus according to claim 12 wherein said pumping pulse oscillator defined in subpart (i) is a multi-mode oscillator operable at a rate of at least 1 hertz having a lasant material selected from the group consisting of alexandrite, Ti:sapphire, and Cr:LiSAF.

14. The apparatus according to claim 12 wherein said lasant material defined in subpart (ii) is selected from the group consisting of neodymium glass and ytterbium glass.

15. The apparatus according to claim 12 wherein said lasant material is in the form of a hollow cylinder having a peripheral exterior wall, an inner surface, a central axis, and respective first and second end walls.

16. The apparatus according to claim 15 wherein said moving means comprises an axle through said axis about which said cylinder rotates.

17. The apparatus according to claim 15 wherein said cooling means comprises a flowing stream of gas or liquid moving in heat transfer relationship with said exterior wall of said hollow cylinder.

18. The apparatus according to claim 15 wherein said cooling means comprises a sleeve of heat conductive material encompassing at least a portion of said peripheral wall.

19. The apparatus according to claim 18 wherein said sleeve is a metal selected from the group of copper, a copper alloy, aluminum, aluminum alloy, and mixtures thereof.

20. The apparatus according to claim 18 wherein said sleeve supports heat transfer fins protruding from an exterior surface of said sleeve.

21. The apparatus according to claim 15 wherein said cooling means comprises heat conductive material which lines said inner surface of said hollow cylinder.

22. The apparatus according to claim 12 wherein said lasant material is in the form of a body having an outer surface, and wherein said cooling means comprises one or more heat conductive substances selected from the group consisting of gases, liquids, and solids in heat transfer relationship with said outer surface.

23. The apparatus according to claim 22 wherein said cooling means comprises said gas or liquid moving in heat transfer relation with the outer surface of said body.

24. The apparatus according to claim 12 wherein said moving means moves said lasant material essentially continuously.

25. The apparatus according to claim 12 wherein said optical pulse generating means comprises an optical oscillator operable at a repetition of at least 1 hertz, and produces pulses having an energy of 100 millijoules.

26. An apparatus for passing optical radiation in the form of optical pulses through a region of lasant material for optically pumping said material which is at an initial base temperature prior to said radiation being passed therethrough, comprising:
  i. a multi-mode pumping laser oscillator which generates a pump pulse defining a beam path;
  ii. a lasant material in the beam path of the pump pulse, said lasant material characterized by an ability to absorb energy from said pump pulse when irradiated by said pump pulse;
  iii. cooling means for removing heat from said lasant material; and
  iv. moving means constructed and arranged to move said lasant material relative to said beam path to position a first region of said material in said beam path during said irradiation, and to position said first region away from said beam path during cooling of said first region while positioning a second region in said beam path for irradiation.

27. The apparatus according to claim 26 wherein said pumping pulse oscillator defined in subpart (i) is a multi-mode oscillator operable at a rate of at least 1 hertz having a lasant material selected from the group consisting of alexandrite, Ti:sapphire, and Cr:LiSAF.

28. The apparatus according to claim 26 wherein said lasant material defined in subpart (ii) is selected from the group consisting of neodymium glass and ytterbium glass.

29. The apparatus according to claim 26 wherein said lasant material is in the form of a hollow cylinder having a peripheral exterior wall, an inner surface, a central axis, and respective first and second end walls; wherein said moving means comprises an axle through said axis about which said cylinder rotates; and wherein said cooling means comprises a sleeve of heat conductive material encompassing at least a portion of said peripheral wall.

* * * * *